US008301494B2

(12) United States Patent  
Wills

(10) Patent No.: US 8,301,494 B2  
(45) Date of Patent: Oct. 30, 2012

(54) METHOD AND SYSTEM FOR MANAGING INVENTORY AND PROMOTIONS CAMPAIGN BASED ON REDEMPTION DATA

(75) Inventor: Scott Wills, Mountain View, CA (US)

(73) Assignee: Catalina Marketing Corporation, St. Petersburg, FL (US)

( * ) Notice: Subject to any disclaimer, the term of this patent is extended or adjusted under 35 U.S.C. 154(b) by 1515 days.

(21) Appl. No.: 10/937,505

(22) Filed: Sep. 10, 2004

(65) Prior Publication Data

US 2005/0222910 A1    Oct. 6, 2005

Related U.S. Application Data

(60) Provisional application No. 60/501,851, filed on Sep. 11, 2003.

(51) Int. Cl.  
*G06Q 30/00* (2012.01)

(52) U.S. Cl. ....................................................... 705/14.1

(58) Field of Classification Search ............... 705/14, 705/14.1  
See application file for complete search history.

(56) References Cited

U.S. PATENT DOCUMENTS

| | | | |
|---|---|---|---|
| 3,632,995 A | 1/1972 | Wilson | 235/61.12 N |
| 4,554,446 A | 11/1985 | Murphy et al. | 235/487 |
| 4,674,041 A | 6/1987 | Lemon et al. | 364/401 |
| 5,004,270 A | 4/1991 | Schaul et al. | 283/48.1 |
| 5,176,224 A | 1/1993 | Spector | 186/52 |
| 5,185,695 A | 2/1993 | Pruchnicki | 364/401 |
| 5,214,793 A | 5/1993 | Conway et al. | 455/49.1 |
| 5,249,044 A | 9/1993 | Von Kohorn | 358/86 |
| 5,285,278 A | 2/1994 | Holman | 358/142 |
| 5,287,181 A | 2/1994 | Holman | 348/473 |
| 5,308,120 A | 5/1994 | Thompson | 283/70 |
| 5,353,218 A * | 10/1994 | De Lapa et al. | 705/14.25 |
| 5,501,491 A | 3/1996 | Thompson | 283/70 |
| 5,627,549 A | 5/1997 | Park | 342/357 |
| 5,684,859 A | 11/1997 | Chanroo et al. | 379/58 |
| 5,822,735 A | 10/1998 | De Lapa et al. | 705/14 |
| 5,844,221 A | 12/1998 | Madigan, Jr. et al. | 235/383 |
| 5,845,259 A | 12/1998 | West et al. | 705/14 |
| 5,852,775 A | 12/1998 | Hidary | 455/404 |
| 5,855,007 A | 12/1998 | Jovicic et al. | 705/14 |
| 5,865,470 A | 2/1999 | Thompson | 283/70 |
| 5,969,678 A | 10/1999 | Stewart | 342/457 |
| 6,014,090 A | 1/2000 | Rosen et al. | 340/905 |
| 6,041,308 A | 3/2000 | Walker et al. | 705/14 |
| 6,076,071 A * | 6/2000 | Freeny, Jr. | 705/14.1 |
| 6,571,279 B1 | 5/2003 | Herz et al. | 709/217 |

(Continued)

OTHER PUBLICATIONS

Newcomb, Kevin, "Google Seeks Patent for Targeting Ads on Wi-Fi Hotspots", *ClickZ*, Mar. 24, 2006, printed from <http://www.clickz.com/3593971>, 1 page.

*Primary Examiner* — Daniel Lastra  
(74) *Attorney, Agent, or Firm* — Pillsbury Winthrop Shaw Pittman LLP

(57) ABSTRACT

Provided is a method and system for the management of inventory and/or promotional campaigns associated with electronic distribution of secure money saving or discount incentives, including coupons and other marketing incentives and, in particular, to modifying a promotional campaign and/or modifying inventory levels and product ordering based on transaction data relating to coupons distributed as part of an online computer system for interactively distributing such incentives to remotely connected consumer computers.

36 Claims, 14 Drawing Sheets

U.S. PATENT DOCUMENTS

| | | | |
|---|---|---|---|
| 6,647,269 B2 | 11/2003 | Hendrey et al. | 455/456 |
| 7,376,591 B2 | 5/2008 | Owens | 705/26 |
| 2001/0051901 A1* | 12/2001 | Hager et al. | 705/26 |
| 2001/0051905 A1* | 12/2001 | Lucas | 705/29 |
| 2002/0042819 A1 | 4/2002 | Reichert et al. | 709/217 |
| 2002/0087384 A1 | 7/2002 | Neifeld | 705/10 |
| 2002/0095340 A1 | 7/2002 | Vermande | 705/14 |
| 2002/0165967 A1 | 11/2002 | Morgan | 709/227 |
| 2002/0194069 A1 | 12/2002 | Thakur et al. | 705/14 |
| 2003/0004802 A1* | 1/2003 | Callegari | 705/14 |
| 2003/0088461 A1 | 5/2003 | Christensen | 705/14 |
| 2003/0171984 A1 | 9/2003 | Wodka et al. | 705/14 |
| 2004/0056101 A1 | 3/2004 | Barkan et al. | 235/472.03 |
| 2004/0249712 A1 | 12/2004 | Brown et al. | 705/14 |
| 2005/0075932 A1 | 4/2005 | Mankoff | 705/14 |
| 2005/0209921 A1 | 9/2005 | Roberts et al. | 705/14 |
| 2005/0216336 A1 | 9/2005 | Roberts et al. | 705/14 |
| 2005/0216337 A1 | 9/2005 | Roberts et al. | 705/14 |
| 2005/0222905 A1 | 10/2005 | Wills | 705/14 |
| 2005/0228719 A1 | 10/2005 | Roberts et al. | 705/14 |
| 2006/0059044 A1 | 3/2006 | Chan et al. | 705/14 |
| 2006/0089878 A1 | 4/2006 | Roberts et al. | 705/14 |
| 2006/0116924 A1 | 6/2006 | Angles et al. | 705/14 |
| 2007/0118426 A1 | 5/2007 | Barnes, Jr. | 705/14 |
| 2007/0174259 A1 | 7/2007 | Amjadi | 707/3 |
| 2007/0204025 A1 | 8/2007 | Cox et al. | 709/223 |
| 2008/0140509 A1 | 6/2008 | Amjadi | 705/10 |

* cited by examiner

EXEMPLARY INVENTORY DATA TABLE

| RETAIL CENTER | PRODUCT TYPE | PRODUCT QUANTITY |
|---|---|---|
| X | A | 100 |
| X | B | 88 |
| X | C | 320 |
| X | D | 407 |
| X | E | 65 |

FIG. 16A

EXEMPLARY TRANSACTION DATA TABLE

| RETAIL CENTER | PRODUCT TYPE | QUANTITY PURCHASED | PRODUCT RETURNS |
|---|---|---|---|
| X | A | 20 | 1 |
| X | B | 35 | 4 |
| X | C | 5 | 0 |
| X | D | 47 | 6 |
| X | E | 16 | 3 |

FIG. 16B

METHOD AND SYSTEM FOR MANAGING INVENTORY AND PROMOTIONS CAMPAIGN BASED ON REDEMPTION DATA

CROSS REFERENCE TO RELATED APPLICATIONS

This application claims priority to U.S. Provisional Patent Application Ser. No. 60/501,851, filed Sep. 11, 2003, and is related to the following applications: "Method and System for Generating Intelligent Electronic Banners Based on User Information", U.S. patent application Ser. No. 10/937,305, filed Sep. 10, 2004; "Proximity-Based Method and System for Generating Customized Incentives", U.S. patent application Ser. No. 10/937,355, filed Sep. 10, 2004; "Method and System for Electronic Distribution of Incentives Having Real-Time Consumer-Based Directions", U.S. patent application Ser. No. 10/937,504, filed Sep. 10, 2004; "Method and System for Electronic Delivery of Incentive Information Based on User Proximity", U.S. patent application Ser. No. 10/937,503, filed Sep. 10, 2004; "Method and System for Presenting Banners Having Direct Link to user Profile Information", U.S. patent application Ser. No. 10/937,367, filed Sep. 10, 2004; and "Method and System for Generating Real-Time Directions Associated with Product Promotions", U.S patent application Ser. No. 10/937,312, filed Sep. 10, 2004.

FIELD OF THE INVENTION

The present invention relates to the management of inventory and/or promotional campaigns associated with electronic distribution of incentives, including coupons and other marketing incentives and, in particular, to modifying a promotional campaign and/or adapting inventory levels and product ordering/replacement based on transaction data relating to coupons distributed as part of an online computer system for interactively distributing such coupons to remotely connected consumer computers.

BACKGROUND OF THE INVENTION

Millions of consumers regularly use product redemption coupons and realize substantial savings as a result. Significant time is spent clipping and sorting coupons, discarding expired coupons and organizing current coupons for use on shopping trips. Conventional coupon distribution results in significant wasted time due to consumers' attempts to manage their coupon use.

Coupons are delivered to consumers through a variety of media such as, for example, free standing inserts (FSIs), in-store shelf coupon dispensers, check-out coupons (generally issued based on the customer's current purchase), register receipt coupons, in-product coupons, instant peel-off on-product coupons, direct mail coupons, and/or other delivery media. In addition to manufacturers' coupons, consumers use retail center coupons, such as those issued by large retail chains on a weekly basis. Some consumers use coupons on a fairly random basis. These consumers tend not to keep coupons for future use, but will review coupons available just prior to shopping to see if any of them cover products they plan to buy or if there are any for new or improved products of interest.

More organized coupon users maintain some form of storage system to keep coupons for future use. These consumers often clip coupons regularly from all available sources, and often have coupon filing systems by product category. They will also review their coupons regularly, discarding unused coupons which have expired.

For most consumers, attempts to maintain an organized coupon file often fails. The "bother" and time required to maintained organized coupon files often results in neglect of those files, even though diligent shoppers know that a consistent significant savings is easily achievable using coupons.

The notion of issuing product redemption coupons to consumers was an innovative idea to entice consumers to try new products in the hope that, after the first try of a new product at a coupon discounted price, they would become repeat customers at the regular price. Coupons are effective tools used in launching new products. Manufacturers also find coupons can shore up flagging sales, help reduce excess inventory or win back consumers' brand loyalty, and so coupons for existing products have become customary, so much so that today's consumers have come to expect coupons. Often, coupon price incentives significantly reduce brand loyalty, and manufacturers must issue more coupons than desired to maintain market share. Market share also has been impacted by an increase in the number and variety of competing "no-name" retail center brands. The competitive nature of the retail industry does not allow manufacturers to reduce coupon distribution, and in some market sectors, such as cereals, the majority of purchases are made with coupons.

Attempts have been made to meet the needs of the coupon industry and the consumer. For example, attempts have included television-based coupon reception system wherein coupon information is transmitted along with program information to a broadcast audience, electronic paperless coupon system where coupon signs are placed near the related item and the discount is automatically applied at the point of sale, kiosk type printer stations located at a retail store linked to the manufacturer(s) in order to obtain specific coupon information, and/or other attempts. While these aforementioned attempts at providing couponing systems are useful in their own right, they fail to provide for a secure and interactive coupon generation system in which the user can request, select, store, manipulate and print coupons as desired, in which user-specific information such as demographic data and data representative of those coupons so requested, selected, printed and actually used may be provided back to the coupon issuer and distributor for more efficient coupon targeting in subsequent coupon issuance and distribution.

Further, the aforementioned attempts at coupon distribution systems fail to provide systems effective in managing inventory and/or managing promotional campaigns based on inventory, transaction and/or user-specific information. Thus, the prior attempts do not provide electronic systems or methods which allow a marketer of a product to collect and process transaction data in such a way as to maximize the value of a promotion to both the marketer of the product and a consumer of the product. It would therefore be desirable to provide a coupon distribution system effective in managing inventory and/or managing promotional campaigns based on inventory, transaction and/or user-specific information.

SUMMARY OF THE INVENTION

In accordance with these and other objects, provided is a system for distributing and generating at a remote site product redemption coupons comprising a centrally located repository of electronically stored product redemption coupon data, transmission means operatively associated with said centrally located repository for providing data communication between said repository and a plurality of remote user computers, and a remote user computer operatively associated with said transmission means. The remote user computer in the present invention comprises interface means for providing user interaction with the centrally located repository, a memory, and a coupon data management program. The coupon data management program is implemented by the computer for requesting coupon data from the centrally located repository, for storing in the memory coupon data transmitted from the centrally located repository, and for generating printable coupon data from the stored coupon data. The remote user computer also comprises a coupon output buffer operatively associated with the data management program for storing the printable coupon data generated by said coupon data management program.

The present invention additionally comprises a printer for printing product redemption coupons from the printable coupon data stored in the coupon output buffer. Alternatively, the system may enable the user to transmit electronically the printable coupon data from the coupon output buffer to the centrally located repository or directly to the retailer for electronic coupon redemption.

As a result of the present invention, a user of a remote user computer is able to request coupon data to be transmitted from said centrally located repository, and the user is able to instruct his computer to print or electronically transfer product redemption coupons generated from the transmitted coupon data. In particular, the user's computer assembles product redemption coupons for printing by using two data components; (1) fixed coupon data which is transmitted to the user's computer during an initialization or "sign-up" process and which remains stored on the user's computer for subsequent coupon generation, and (2) variable coupon data which is transmitted to the user's computer whenever the user requests coupon data from the repository. Further, a coupon issuer, coupon distributor or online server may transmit coupon data from the repository to the user's computer as part of a promotion. The user may be targeted based upon proximity to a distribution center or a defined geographic area and/or proximity to competitors. Coupon data may be automatically downloaded when the user accesses the online server or at some other specified time. In addition, the coupon data may be selectively transmitted by any means based upon previous inputs by the user. For example, the user could request that only coupon data related to food-based items be offered and that all such coupon data be automatically downloaded.

Additionally, the coupon data management program of the present invention operates in conjunction with the remote computer to allow the user to select and retail center certain desired coupon data from the coupon data transmitted by the centrally located repository and print coupons as selected. The coupon data management program also allows the user to generate a shopping list which is correlated to the coupons printed for subsequent redemption.

In the present invention, the data exchange capabilities provided by the transmission medium between the remote computer and the central repository allow the automatic transfer of valuable information from the remote computer to the central repository and, ultimately, to the coupon distributing and issuing centers. Information related to the coupons selected and printed can be supplied to the coupon distributors and issuers, which can also use information obtained from the various retail stores as to which coupons were actually redeemed in order to more intelligently market subsequent coupons and target coupon issuance in a more cost effective manner.

The data exchange capabilities are further advantageously utilized in the present invention to allow, via the central repository, the updating of coupon data stored in the user's remote computer without required interaction from the user if the user is online. In particular, the central repository can delete expired coupons from the remote computer's coupon database and can vary the amount of redemption value of a non-expired coupon if so desired. The capability for the updating and deleting of coupons within a user's computer is programmed in the user's computer such that no further interaction with the central repository is required for such coupons to be deleted or updated.

The present invention provides for secure coupon generation by allowing the printing of a particular coupon only once. Further, and quite importantly, the present invention provides for the printing on each coupon of certain user-specific data, thus making each coupon printed unique. Thus, two different users with access to printing a particular coupon will each print coupons with the same product, discount, and expiration date data, yet each will be unique since printed thereon will be user-specific data, preferably in the form of a user-specific bar code. Thus, any attempts to duplicate via photocopying techniques any particular coupon will be discouraged since the coupon redemption center will detect when a particular coupon has been redeemed, will identify the user who redeems a particular coupon, and will disallow any attempt at redemption of a second coupon with identical product and user-specific data.

The present invention further provides a system for managing inventory associated with a promotional campaign, which comprises: means for storing inventory data for a retail center; means for electronically distributing an incentive to a user; means for processing a transaction corresponding to the incentive to produce transaction data; and means for associating the transaction data with the inventory data to update said inventory data.

The present invention even further provides a system for managing inventory associated with a promotional campaign, which comprises: an inventory database for storing inventory data; means for electronically distributing a incentive to a user via an online service provider capable of being accessed through the Internet by the user; a point-of-sale terminal for processing a transaction corresponding to the coupon to produce transaction data; and means for associating the transaction data with the inventory data to update said inventory data on a real-time basis.

The present invention also provides a system for managing a promotional campaign based on inventory data, which comprises: means for storing inventory data for a store; means for storing incentive data corresponding to the inventory data for the store; means for electronically distributing the incentive data to a user; means for processing a transaction corresponding to the incentive data to produce transaction data; means for associating the transaction data with the inventory data to update said inventory data; and means for associating the incentive data with the updated inventory data and adjusting the coupon data in response to said updated inventory data.

The present invention additionally provides a method for managing inventory associated with a promotional campaign, which comprises: an inventory database for storing inventory data; means for electronically distributing an incentive to a user via an online service provider capable of being accessed through the Internet by the user; a point-of-sale terminal for processing a transaction corresponding to the incentive to produce transaction data; and means for associating the transaction data with the inventory data to update said inventory data on a real-time basis.

The present invention further provides a method for managing a promotional campaign based on inventory data, which comprises: storing inventory data for a retail center in an inventory database; storing incentive data corresponding to the inventory data for the store; electronically distributing the incentive data to a user; processing a transaction corresponding to the incentive data to produce transaction data; associating the transaction data with the inventory data to update said inventory data; and associating the coupon data with the updated inventory data and adjusting said coupon data in response to said updated inventory data.

BRIEF DESCRIPTION OF THE DRAWINGS

FIG. 16A is an exemplary data table of inventory data according to one implementation of the invention.

FIG. 16B is an exemplary data table of transaction data according to one implementation of the invention.

DETAILED DESCRIPTION OF PREFERRED EMBODIMENTS

Figure 1:
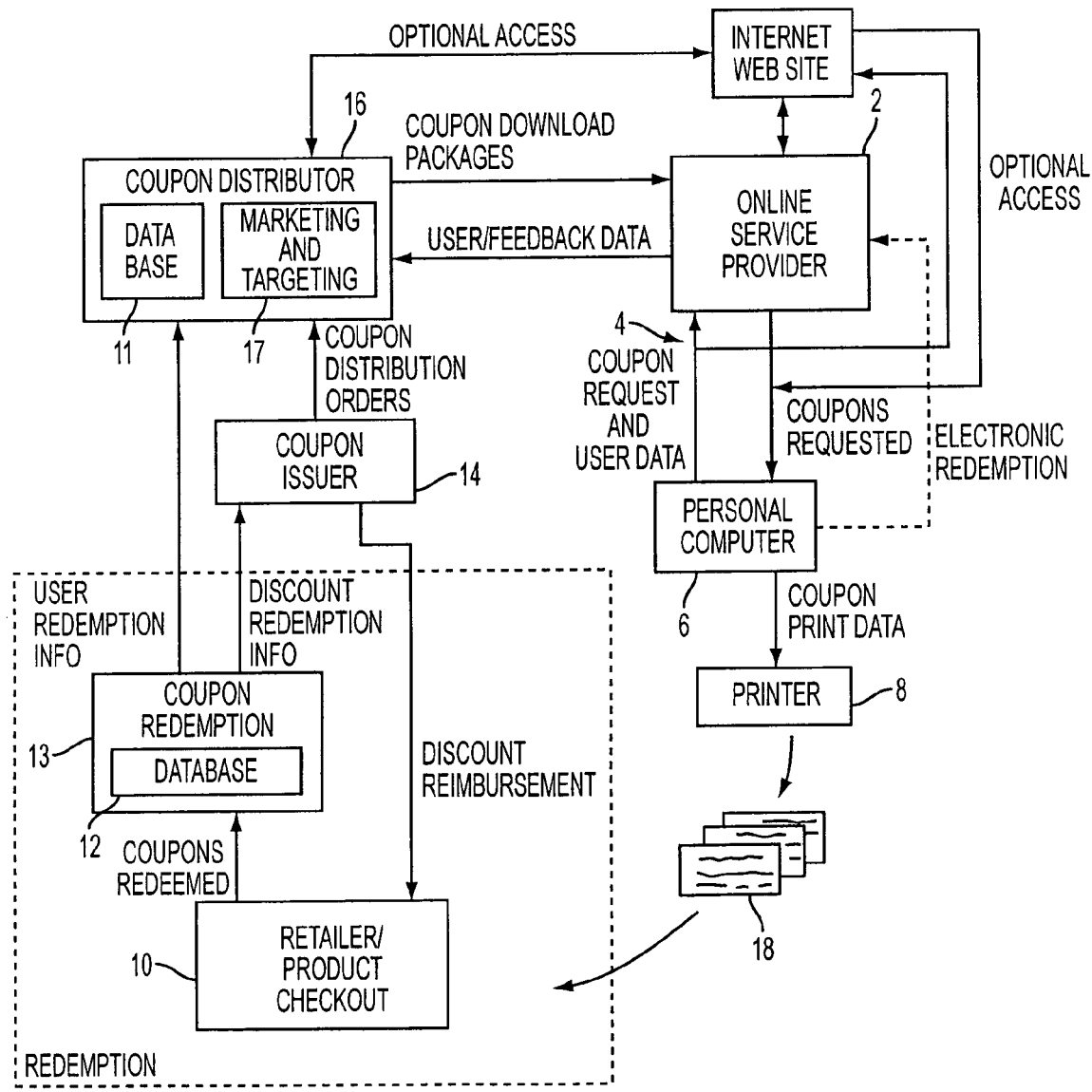
FIG. 1 is a schematic block diagram of the system of the preferred embodiment for the electronic distribution of coupons.
Figure 8:
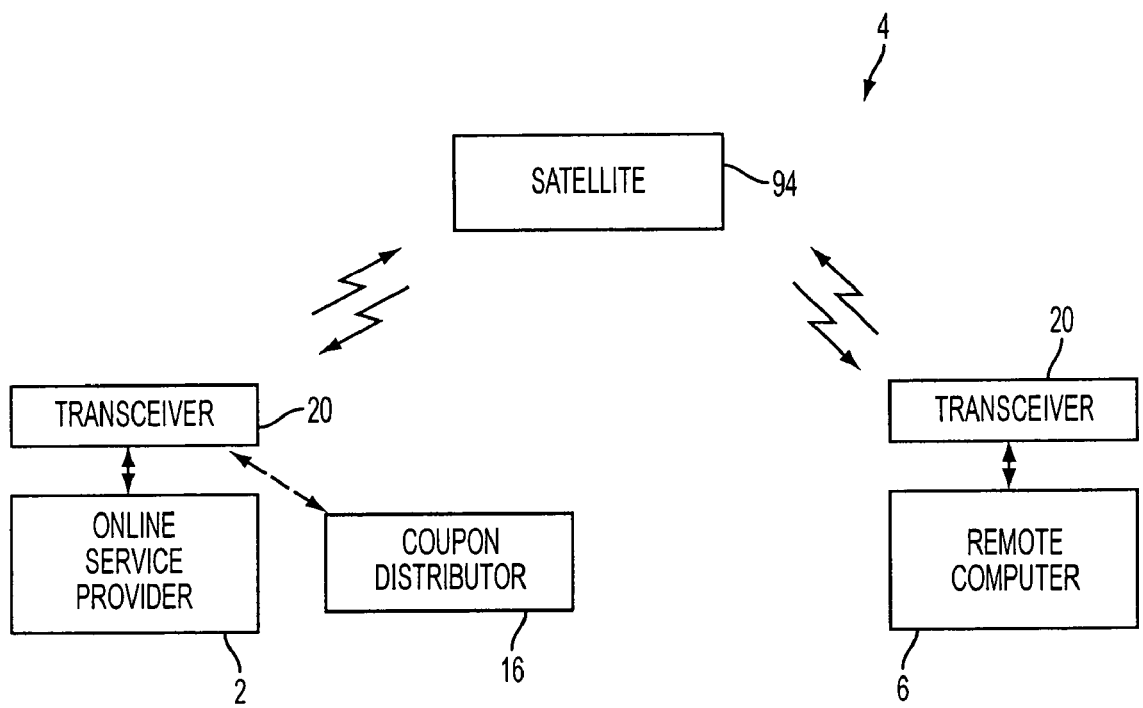
FIG. 8 is a block diagram of an alternative embodiment of the present invention in which data is transmitted between the central repository and personal computer by satellite.
Figure 9:
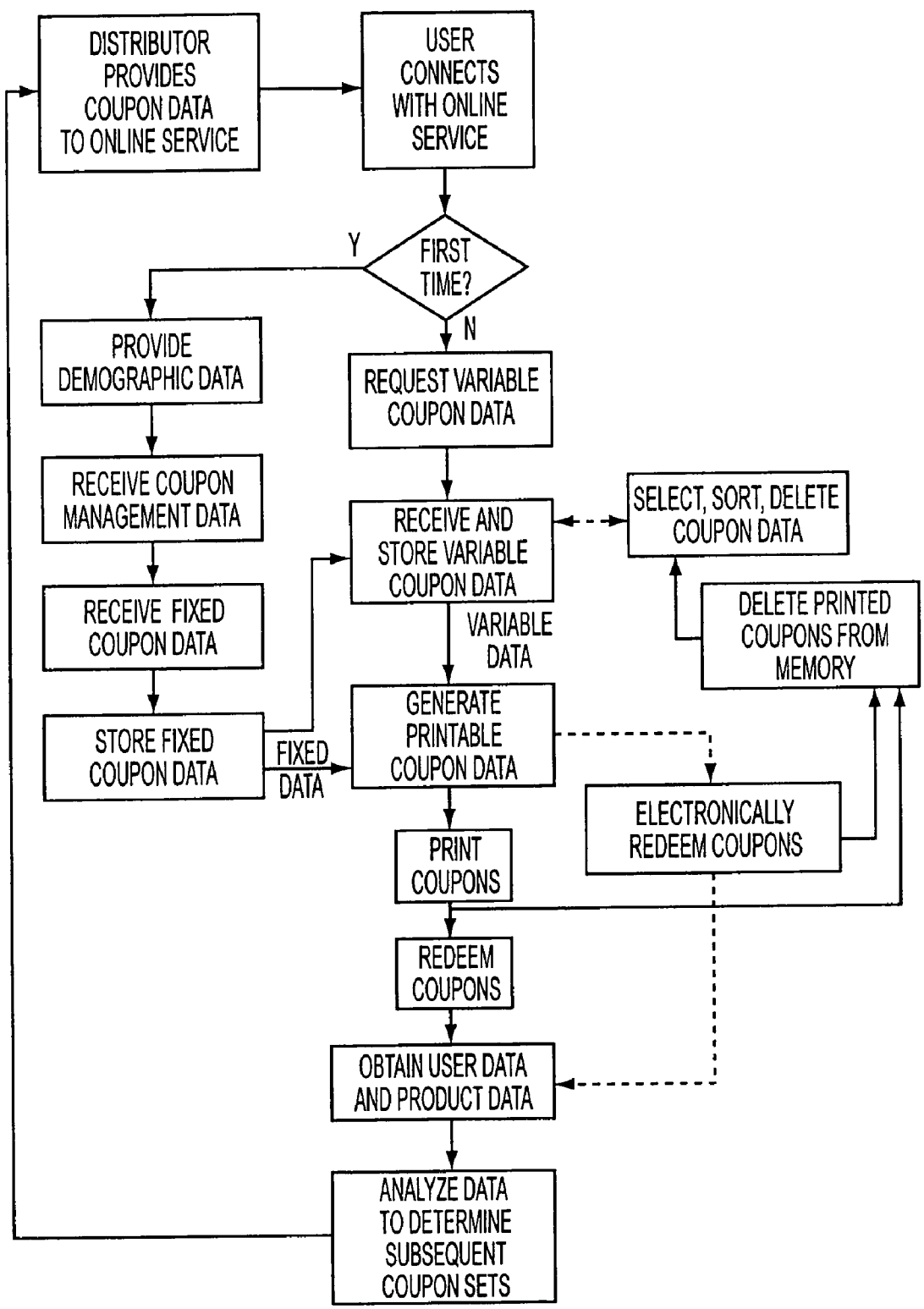
FIG. 9 is a flowchart of the operation of an embodiment of the present invention.

Referring to the system block diagram of FIG. 1 and the flowchart of FIG. 9, the electronic coupon distribution system of the preferred embodiment comprises a repository of electronically stored coupon data, which in the preferred embodiment is an online service provider 2. The repository is optionally a centrally located repository. The term online service provider refers herein to any computer-based information service provider which is accessible by a remote personal computer user via a communications data link such as the public switched telephone network (PSTN) or the like, such as PRODIGY, COMPUSERVE, or AMERICA ONLINE. In addition, it is contemplated that the electronic coupon data distribution may be carried out by connection to any readily accessible Internet site such as the World Wide Web. Further, it is contemplated that the electronic coupon data distribution may be carried out via television cable lines, digital Broadcast Satellites, terrestrial-based transmissions, or interactive television systems. Referring to FIG. 8, it is further contemplated that electronic coupon distribution may also be carried out via digital satellite communication links, thus avoiding the need for hardwired (i.e., PSTN) connectivity between the repository and the remote user computer. Thus, any centrally located computer system which is accessible to the public by any transmission means is contemplated as being within the scope of this invention. As used herein, the term "user" denotes an individual user or a household of users linked through one account.

The online service provider 2 has stored in its database 40 (see FIGS. 6 and 10) various packages of electronic incentives, including coupon data and optionally inventory data, the content of which will be further described below. The electronic coupon data is provided, by a coupon distributor 16 or coupon issuer 14, by any various means such as electronic transmission via the PSTN or satellite data exchange. The online service provider also stores in a demographic data file 42 user-specific data, including coupons selected data, coupons deleted data, coupons printed data, user demographics, including user location data, as will be described below, for subsequent transmission to a coupon distributor 16 or a coupon issuer 14. The coupon distributor 16 or coupon issuer 14 will utilize the user-specific data and coupon redemption data in compiling subsequent coupon packages targeted specifically at certain user categories, including users located within a predetermined geographic area or within a predetermined proximity range of a retail center, without limitation.

Figure 2:
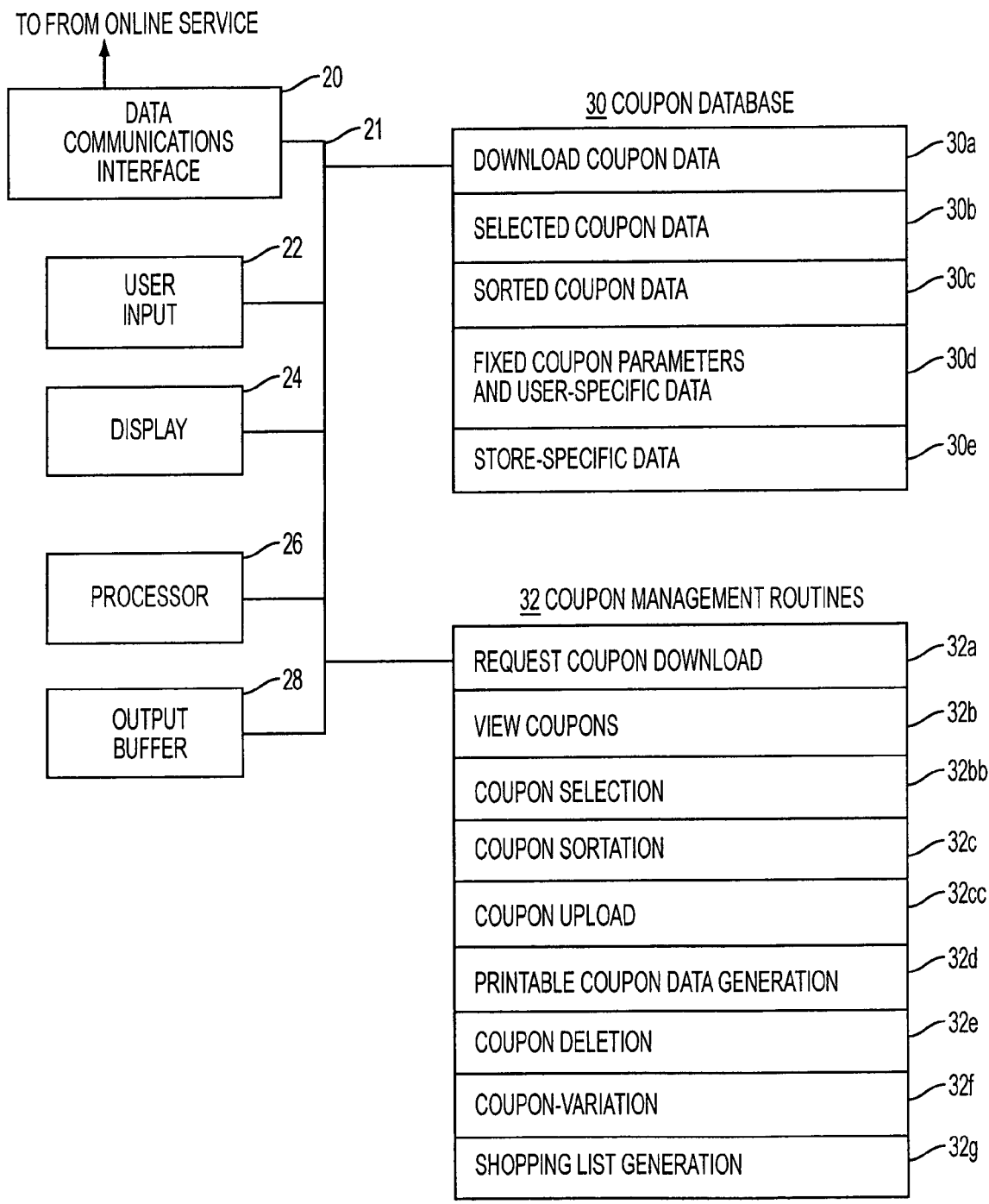
FIG. 2 is a detailed block diagram of the remote personal computer of FIG. 1 configured in accordance with the present invention.

The online service provider 2 is connected with the data link 4 and is thus accessible by any remote personal computer 6 having a data communications interface 20 such as a modem (see FIG. 2). The online service provider communicates with the personal computer 6 in order to transmit requested coupon data, and also in order to receive coupon requests and the user-specific data mentioned above.

The remote personal computer 6 has connected thereto a printer 8, which may be any type of computer printer capable of printing graphics. The printer 8 is instructed by the coupon data management routines 32 stored in the computer 6 in order to print printed coupons 18, as will be described in detail below.

The printed coupons 18 are used in the normal fashion by a consumer when shopping at a desired retail center 10. That is, the coupons 18 are presented to a product checkout station 11 along with the associated products for purchase, and the discount amount shown on the coupon 18 is credited to the consumer at the point-of-sale. The redeemed coupons 18 are transmitted to a coupon redemption center 13 where they are electronically read, and user-specific data is stored in a coupon redemption database 12.

Figure 5:
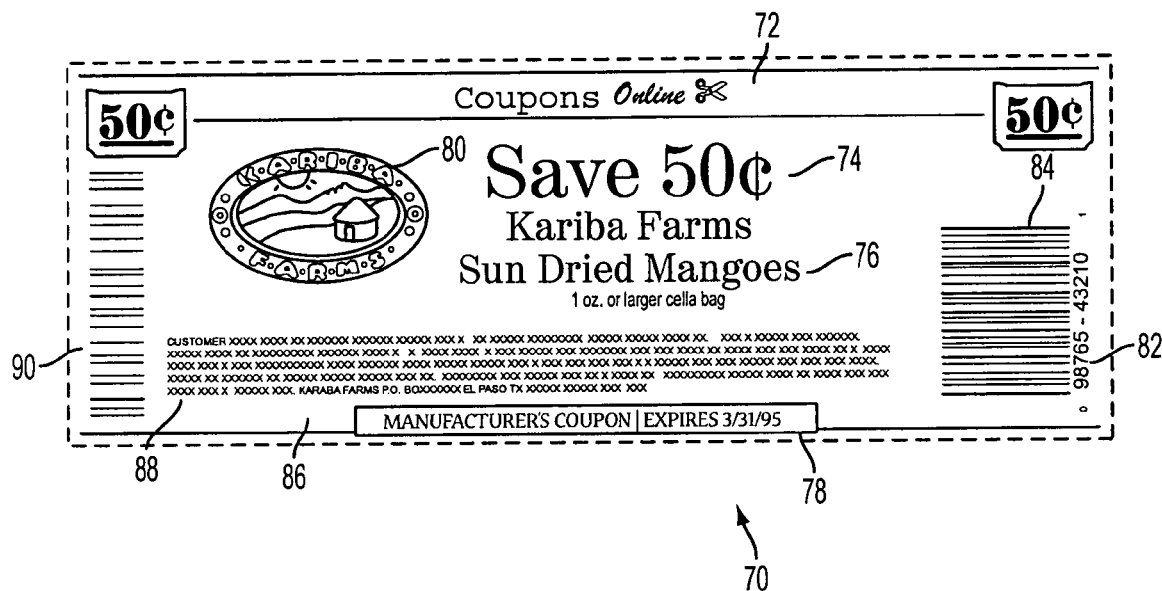
FIG. 5 is a diagram of a printed coupon resulting from the electronic distribution in accordance with the present invention.

In addition to the usual coupon information found in prior art coupons (e.g., redemption amount, company and product name, expiration date, etc.), the coupons 18 of the preferred embodiment of the present invention contain user-specific data in the form of a unique user bar code 90, as shown graphically in FIG. 5. The user bar code 90 is encoded with user-specific information such as the user name and/or other unique identification criteria such as a social security number or online service address. This information renders each printed coupon 18 unique, since an otherwise similar coupon presented by a different consumer will comprise a different user bar code 90. The use of a unique coupon 18 is but one aspect of the secure nature of the present invention as will be described in detail below.

The coupon redemption center 13 receives from a number of stores 10 the coupons redeemed, verifies the value of the redeemed coupons, determines the identification of users who redeemed the coupons, and distributes the information read from the coupons 18 to the individual coupon issuer 14 and to the coupon distributor 16. In particular, information regarding the redemption amount and the redeeming retail center 10 is forwarded to the particular coupon issuer 14 named on the coupon 18, which then credits the redeeming retail center 10 with the total amount of discounts given. Of particular value in the present invention is the distribution of user-specific data to the coupon distribution center 16, which collates such user information and performs marketing analysis via a marketing analysis means 17 in order to compile subsequent coupon packages targeted specifically at certain user categories. The coupon distribution center 16 utilizes the user-specific redemption data along with user-specific demographic data, including user location data, supplied by the online service provider 2 in order to compile subsequent coupon data download packages for use by consumers once again. Non-limiting exemplary "user location data" includes to data which identifies the geographic location of a remote user computer, such as a local street address, city, township, county, state, country, zip-code, telephone area-code, telephone prefix, map coordinate, zone, and/or region.

Figures 4A, 4B:
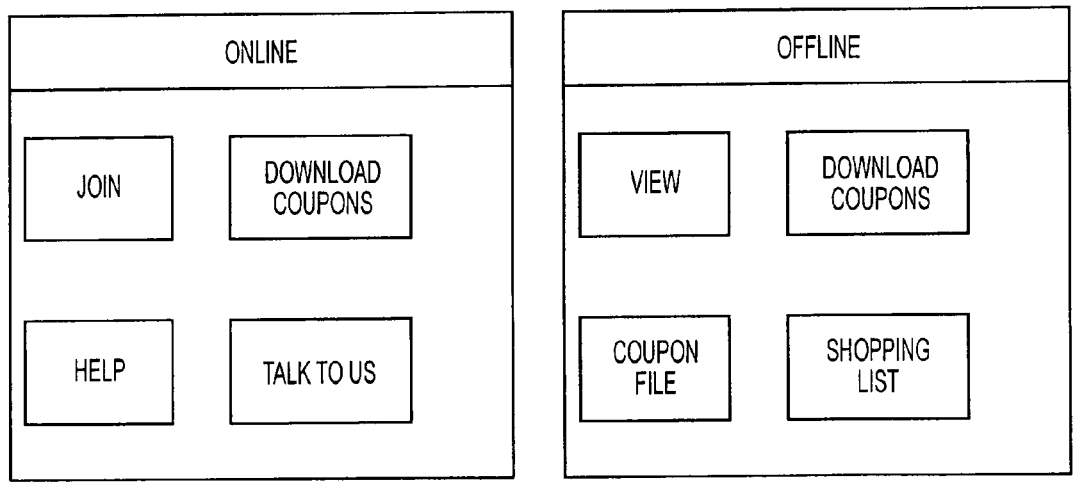
FIGS. 4A and 4B is a pictorial representations of the online and off-line display screens, respectively, which are exhibited to a user in the present invention.

An online display screen 60 is shown in FIG. 4A, which is provided to a user on a display 24 of his remote computer 6 whenever he is in online communication with the service provider 2. The online display screen 60 comprises a join service function button 62, a download coupons function button 64, a help function button 66, and an online communications button 68. When the user desires to initially register for the electronic coupon distribution service, he selects the join service function button 62 which initiates a dialog with the online service provider 2 in order to request certain demographic data, including user location data, from the user which will be used to target specific coupon data packages for subsequent downloading. The user has the option of providing the requested information if he so desires. In addition, an off-line coupon management program is transmitted electronically to the user's computer 6 for subsequent coupon data requesting, downloading and processing. User location data may also be obtained by any means other than user inputs, such as, for example, by searching an online telephone directory. This could, for example, serve the purpose of minimizing the inconvenience to the user. Such user location data could be subsequently presented to the user for confirmation, for example, without limitation.

Figure 6:
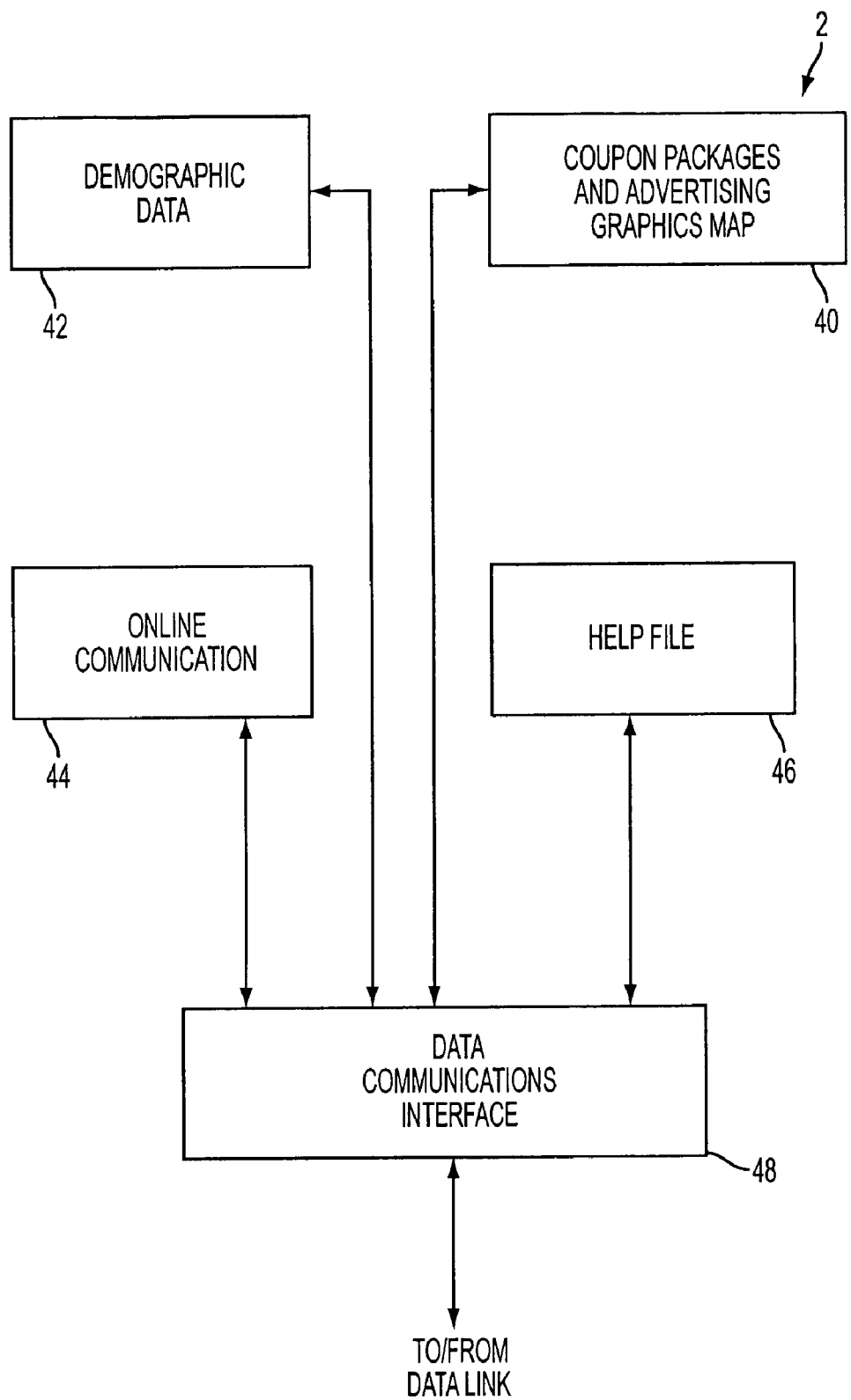
FIG. 6 is a schematic block diagram illustrating the main functional areas serviced by the online service provider of the preferred embodiment system.

FIG. 6 illustrates the functional aspects of the online service provider 2 in the preferred embodiment of the present invention. The main features provided by the online service provider 2 are the coupon packages file 40, the demographic data file 42, the online communications server 44, and the help file 46. Each of the aforementioned features communicates with the user via the data communications interface 48.

The coupon packages file 40 comprises electronic coupon data and other types of advertising materials supplied by the various coupon issuers 14 through the coupon distributor 16. Individual users' coupon data packages are drawn from this file based on demographic data, including user location data, and historic buying profiles stored in the demographic data file 42. Advertisements may consist of graphics, text, recipes, competitions or other inducements or a combination thereof.

After joining the electronic coupon service, the user can order a package of electronic coupons from the online service provider 2 by selecting the download coupon function button 64. When this button is selected, commands are generated and transmitted via the data communications interface 20, through the data link 4, and up to the coupon package file 40 resident at the online service provider 2. The requested coupon data package and associated advertising materials are transmitted by the online service provider 2 to the personal computer 6, where it is stored in the downloaded coupon data file 30a in the coupon database 30.

The demographic data file 42 contains data representative of demographic, including user location, inquiries presented to a user at the time that the user requests a download of coupon data from the coupon package data file 40, as well as data representative of the users' responses thereto.

The online communication server 44 is accessed by the user selecting the online communication button 68. The online communication server is a bulletin board type file where users can post messages to a coupon distributor or issuer regarding any issue of interest. The message data is transferred to the appropriate destination by the online service provider 2, which also collects the responses thereto and posts them on the online communication server 44, thus allowing the user to fetch the response when logged on at a subsequent time.

By selecting the help function button 66, the help file 46 is used as a means for providing standard help and other useful information to a user.

Referring to FIG. 2, the remote personal computer 6 of the preferred embodiment comprises a data communications interface 20 (such as a modem) for connecting the computer to the data link 4 (such as a PSTN), a user input device 22 such as a keyboard and mouse or other type pointing device, a display 24, and a processor 26, all of which are common to personal computers and are well known in the art. The computer 6 also comprises an output buffer 28, which typically resides in random access memory. The computer 6 is configured to operate in accordance with the present invention via a coupon database file 30 and an off-line coupon data management routine file 32 loaded onto a fixed memory such as a hard disk drive. All of these internal components and files are connected to a data bus 21 for communication therebetween in accordance with techniques well known in the art.

The coupon database file 30 is segmented into various sections as shown in the memory map of FIG. 2. The coupon database of the preferred embodiment comprises downloaded coupon data 30a, which is the entire coupon data package downloaded from the online service provider 2; selected coupon data 30b, which is a subset of the downloaded data and represents specific coupons electronically "clipped" and stored therein; sorted coupon data 30c, which is selected coupon data sorted in accordance with a particular set of criteria (e.g., all fruits together, then all dairy products, etc.); fixed coupon parameters and user-specific data 30d, which is certain unvarying data used in printing the coupons as will be described in detail below; and store-specific data 30e, which includes data fields for inventory, transaction data and delivery data, as will be further described below, as well as, information regarding the product arrangement in a certain center 10 which will allow the user to prepare a shopping list tailored to the particular store.

The off-line coupon data management routines 32 are executed by the processor 26 in conjunction with the coupon database 30 in order to request, obtain, store, select, sort, and print coupons as desired. The off-line coupon data management routines 32 are executed by selecting a desired function button 52, 54, 56, or 58 as shown in the off-line display screen 50 in FIG. 4b. The off-line display screen 50 is shown on the display 24 when the user runs the coupon data management program on his or her personal computer 6. The off-line coupon data management routines 32 are executed in an off-line fashion; that is, the user does not need to first be in online communication with the service provider 2. If a particular function button 52, 54, 56, or 58 chosen by the user initiates a routine 32 which requires online communication, that routine will initiate, control and terminate an online session with the service provider 2 automatically.

The request coupon download routine 32a is executed when the user desires to order a package of electronic coupons from the online service provider 2. This routine is called when the user selects the download coupon function button 54. When this routine is called, commands generated by this routine are transmitted via the data communications interface 20, through the data link 4, and up to the coupon package file 40 resident at the online service provider 2. The requested coupon data package and associated advertising materials are transmitted by the online service provider 2 to the personal computer 6, where it is stored in the downloaded coupon data file 30a in the coupon database 30.

Prior to downloading the requested coupon data package to the computer 6, the demographic data file 42 provides certain demographic, including location, queries to the user in order to obtain valuable information for use in marketing analysis and subsequent coupon package generation. The users' responses to the queries are transmitted to the online service provider 2 and stored in the demographic data file 42 for subsequent processing.

The user may select the view function button 52 in order to view the coupons and advertisements previously downloaded. This selection will call the view coupons routine 32b, which will access the downloaded coupon data file 30a and present it to the user via the display 24.

While viewing the coupons and advertisement, the user may select a desired coupon for further sorting, storage, printing or deleting and/or shopping list generation by selecting or "clipping" the coupon with the mouse or keyboard input 22. Coupons are clipped by scrolling through related advertisements. In order to avoid the need for clipping, the user may print or delete a desired coupon. The coupons selected in this function are stored for further processing in the selected coupon data file 30b.

The coupon file function button 56 enables the user to perform several operations on his selected coupon data file 30b. The user may view the coupons selected (from the selected coupon data file 30b), and may choose any of them for printing. Further, a sortation option is provided which logically sorts, by category and subcategory, the coupons stored. Thus, the management program automatically places all the dairy coupons together, and may also place all the milk coupons together within the dairy category. This is carried out by the coupon sortation routine 32c, and is akin to the manual filing system used in the prior art and will aid the user in viewing his selected but unprinted coupons in an efficient manner. The sorted coupons may be loaded into the sorted coupon data file 30c for subsequent viewing and printing. The user may optionally sort the coupons manually by his own classification.

The shopping list function button 58 calls the shopping list generation routine 32g when selected by the user. This routine will allow the user to generate a list from a menu presented on the screen whichever items the user desires to purchase, and the user can retail center and/or print this list as desired. The items on the list are compared against coupon data stored in the coupon database 30 and the user is informed of their existence. The user may then print out those coupons along with the shopping list. Alternatively, the user may select certain coupons for printing, and the item associated therewith is automatically placed on the shopping list. Thus, in either fashion, the user's shopping list generation and coupon "clipping" tasks are conveniently merged in a timesaving manner.

The shopping list generation routine 32g may also advantageously use data stored in the store-specific data file 30e in order to prepare a shopping list tailored to an individual retail store. Thus, data regarding the layout of the store, the food items available at the store, and the like, are used by the list generation routine 32g in order to organize the purchase items accordingly. The data stored in the store-specific data file 30e may be obtained by any of several methods; by downloading from the online service provider 2, by inputting via a floppy disk memory supplied by the store, or even manually input by the user. Data for different stores can be kept in the file 30e and the user simply selects the retail center he intends on using at that particular time. The user may select a standard pre-programmed shopping list, his last generated shopping list, or a blank shopping list from which to commence his shopping list preparation.

The coupon upload routine 32cc is called automatically and without user request whenever user requests a coupon download package from the online service provider 2. A record is kept by the upload routine 32cc indicative of each coupon selected by the user and each coupon printed by the user. This record is sent to the demographic data file 42 in the online service provider 2, and is used for marketing analysis along with data regarding which coupons were actually redeemed, which information is obtained from the manufacturers' redemption agency or center.

Coupons are printed by the printable coupon data generation routine 32d, which is invoked by a user when he selects a print command from the coupon file function 56. This routine obtains data from two sources in the coupon database 30: the fixed coupon parameters and user-specific data file 30d, and the variable coupon data associated with the particular coupon selected for printing.

Figure 3:
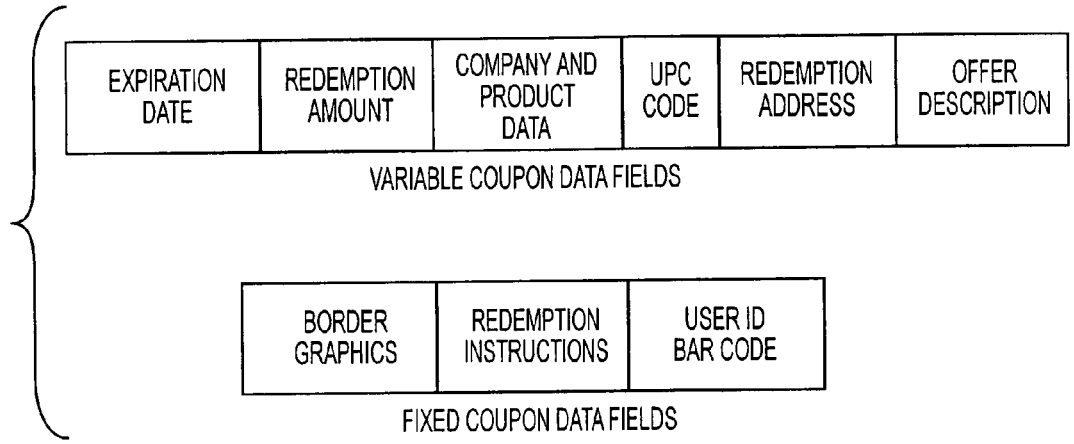
FIG. 3 illustrates exemplary data field formats of the electronic coupon data as implemented in the present invention.

Referring to FIG. 3, the data format of the fixed coupon parameters and user-specific data are set forth and include predefined border graphics which are the same for every coupon printed, redemption instructions, and a user identification bar code number. The user identification bar code number is a unique number assigned to that user, e.g. his social security number or online identification number. This number will be encoded by the printable coupon data generation routine 32d and printed as a bar code 90 on each coupon 18 printed for the particular user. This information will thus be obtained by the coupon redemption center and provided to the coupon distributor 16 for demographic analysis and the like.

The unique user bar code 90 also renders the electronic coupon system of the present invention secure and virtually fraud-proof. Although a user is able to print out a particular coupon 18 only once (to be described in detail below), the coupon issuer 14 could still be defrauded by a user or retailer who might photocopy a printed coupon numerous times and fraudulently and repeatedly present it for redemption. However, in accordance with the present invention, each coupon printed by a user is unique, and the scanning of a coupon presented for redemption will be stored at the coupon redemption center. Thus, the coupon issuer will know if a particular user has redeemed a particular coupon and thus disallow further redemption of a photocopied coupon bearing the same indicia.

Referring again to FIG. 3, the data format of the variable coupon parameters are set forth and include the coupon expiration date, the redemption amount, the company and product information, the UPC code, the redemption address, and the description of the coupon offer.

Thus, the printable coupon data generation routine 32*d* combines all this information and generates a record indicative of the unique coupon to be printed. This record is temporarily stored in the output buffer 28, where it is subsequently sent to the printer 8 for printing. In the alternative, the coupon may be redeemed electronically by sending the coupon data in the output buffer via the data communications interface 20 back to the online service provider 2. This is especially useful in the "electronic shopping mall" environment now found in many online services. The electronic coupon data could also be routed via the data communications interface 20 to a retail center where the user will be shopping, where the coupon data is held in a buffer pending purchase by the user of the matching product.

As described above, the electronic coupon distribution system of the present invention allows the printing of a particular coupon only once, thus providing for security and guarding against fraudulent redemption. This is accomplished by the coupon deletion routine 32*e*, which is called whenever a coupon is printed and deletes the coupon from the database 30 or renders it unprintable by setting an appropriate flag. In addition, the coupon deletion routine 32*e* allows for automatic deletion of expired coupons by periodically checking the expiration date field of each coupon against a real-time clock found in the computer 6. Optionally, the user may voluntarily delete any coupon which is expired if the real-time clock is not set to the correct date. For the user's convenience, the online service provider 2 can check the system clock of the user's computer 6 during a communications session and, if the date is incorrect, can ask the user if he would like the date adjusted automatically.

Since the actual expiration date is always printed as part of the coupon, the function of deleting expired coupon data from the user's computer 6 is for the convenience of the user rather than for security purposes.

The system of the present invention also allows for time-sensitive deletion of certain coupon data from the user computer 6 which is unrelated to the expiration date. That is, certain coupon data may be automatically deleted from the user's computer after, e.g., one month, notwithstanding that the coupon, if printed, might have an expiration date in six months. This feature is included to prompt users who know of the time-sensitive autodeletion to promptly print (and use) coupons rather than risk having them deleted from their database.

The coupon management program also can vary the redemption value of any coupon already downloaded to the user's computer 6 without the need for specific user interaction. A coupon variation routine 32*f* is called which aids in this task. Again, any time that a user initiates a download of coupon data, the on-line service provider 2 can update redemption amounts for coupons whose issuers have decided to change the discount amount.

Referring to FIG. 5, the secure coupon 70 generated and printed in the preferred embodiment is illustrated in detail. The secure coupon 70 comprises the following fixed components taken from the fixed coupon parameter and user-specific data file 30*d*: border graphics 72, redemption instructions 88, and user identification bar code 90. The secure coupon 70 also comprises the following variable components which change for each coupon selected: expiration date 78, redemption amount 74, description of the offer 76, company and/or product information 80, the item's UPC number 82 and the associated UPC bar code 84, and the redemption address 86.

Figure 10:
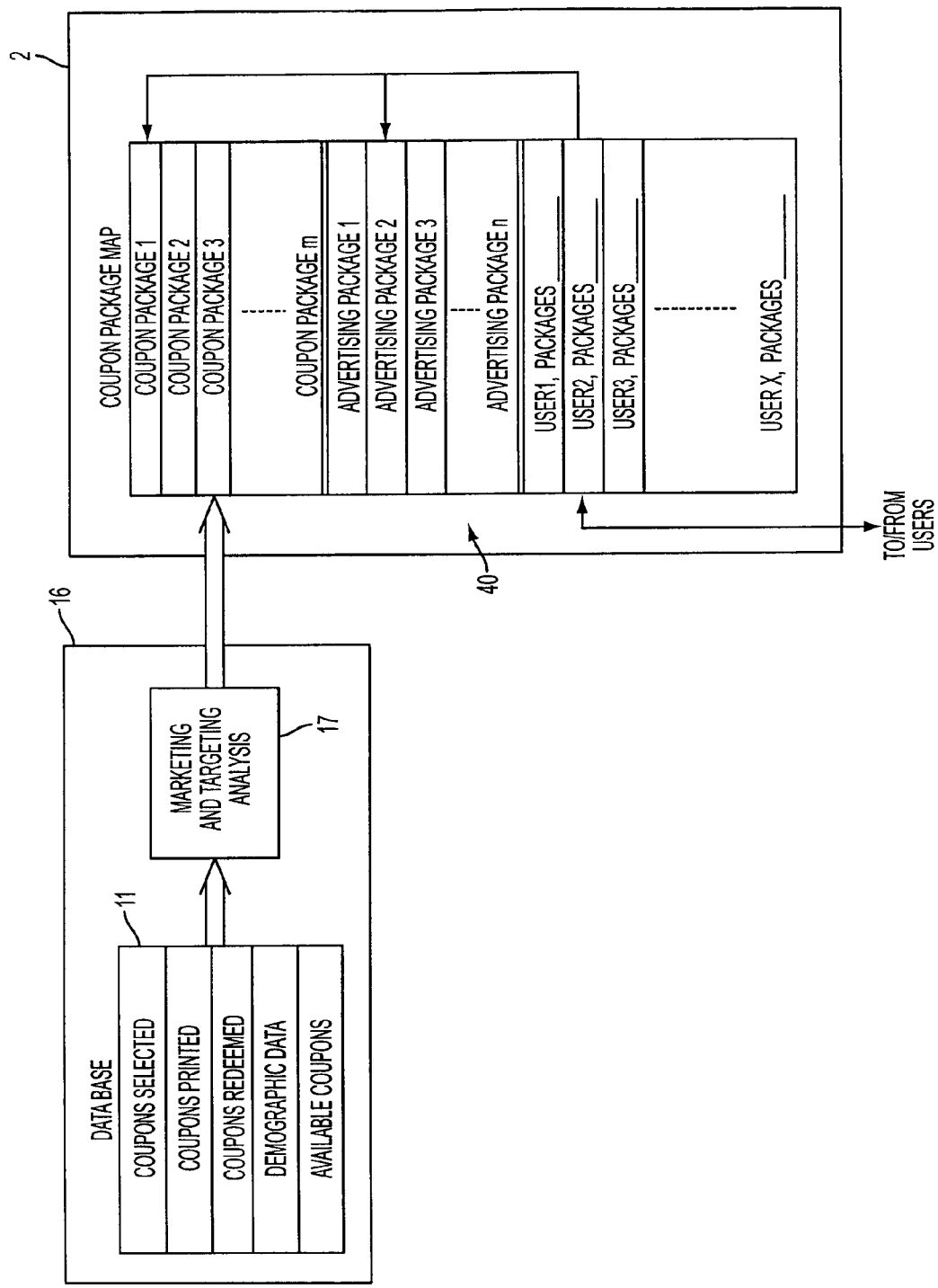
FIG. 10 is a schematic block diagram of the implementation of the coupon data package generation.

Referring to FIG. 10, the generation of coupon data packages by the coupon distributor 16 will be explained. The information collected by the coupon distributor 16 from the online service provider 2 regarding the coupon data selected by the user, the coupon data printed by the user, and the requested demographic information is stored in a database 11. The database 11 also stores information from the coupon redemption center 13 regarding the coupons actually redeemed by the user. The database 11 further stores information regarding all coupons which are made available by the various coupon issuers 14 from which it will generate coupon data packages for subsequent downloading to users.

The information stored in the database 11 is input to the marketing and targeting analysis means 17, which carries out the function of analyzing the aforementioned information in a manner known in the art to arrive at different coupon packages. That is, it may be determined by the analysis means 17 that users with dogs in their household (which is known by the demographic responses) will get a certain package comprising dog food coupons. It may be further determined that users who select, print and redeem dog food coupons of Brand X will get coupons issued by Brand Y, or will get only low value coupons since they are already dog food coupon users, etc. That is, depending on the marketing and targeting criteria and objectives, the analysis means will generate coupon packages as desired. Also, a promotion may be customized based on a combination of proximity ranges, competitor parameters and marketing and targeting criteria and objectives.

In addition, coupon packages may be customized according to marketing analysis relating to user location data and redemption data for users within specified locations and specified proximity ranges to distribution centers and competitor-distribution centers, as well as other external data, such as data relating to non-coupon transactions, inventory turnover, market conditions, cost of raw materials, etc.

Further, another preferred embodiment incorporates pre-established responses to redemption data and/or marketing analysis to adjust a customized promotion. Such pre-established responses are set when the customized promotion is initially created or at some later time. Such a system would not require input or manual analysis by personnel. This minimizes labor intensive marketing activities and results in a highly efficient system for use in a corporate marketing and promotional strategy, particularly where numerous fine adjustments to promotions can have a substantial impact on redemption rates.

Thus, the analysis means generates a number of differing coupon data packages for transmittal to the online service provider 2. The analysis means also provides specific mapping information which will instruct the online service provider as to which user should be provided with which package(s). For example, user 1 may be mapped to coupon data packages 2 and 3; user no. 2 to packages 3 and 6, etc. This mapping function may be carried out by the coupon distributor and provided to the online service provider at regular intervals, e.g. once per week.

Thus, the coupon selection, printing and redemption habits may be analyzed over a time period and used to determine the subsequent targeted packages.

In addition to mapping certain coupon data packages to certain users, certain advertising packages may be mapped to the users in a similar fashion.

In accordance with the present invention, the marketing analysis, coupon packaging, and coupon package distribution functions carried out by the coupon distributor 16 may be carried out at the central data repository, i.e. Internet web site. Further, the coupon redemption and user redemption information processing functions individually carried out by the coupon redemption center 13 and the individual retail stores 10 may be combined into a single redemption center, as shown by the dotted line in FIG. 1. The physical layout of the functions within the system of the present invention is a matter of practicality and choice of the systems designer and does not impact the utility of the present invention.

Figure 7:
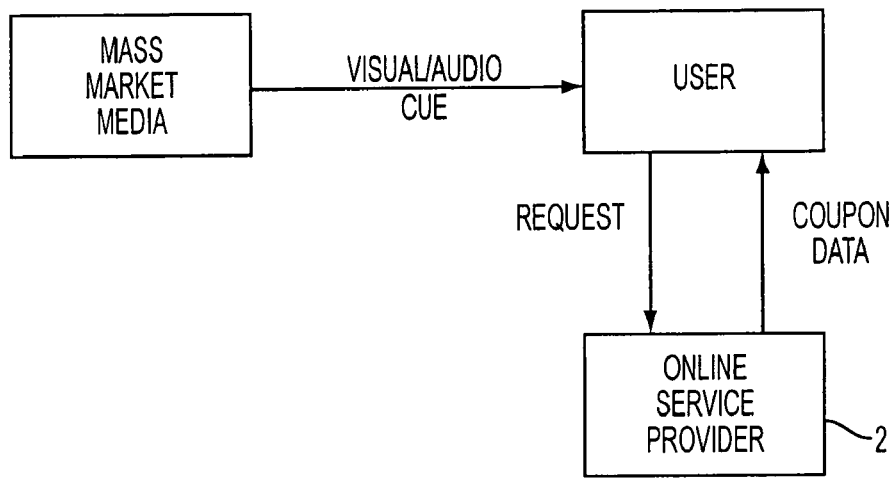
FIG. 7 is a diagram of the use of an external cue to prompt access by the user of the system.

In an alternative embodiment of the present invention, the user is provided with a visual or auditory stimulus or cue to suggest an access of the electronic coupon distribution system. Referring to FIG. 7, a message or logo may be included along with the advertising material normally provided on television, in the newspapers, and the like. This will indicate to a user that he should access the online service provider 2 in order to obtain coupon data related to the advertised product. The availability of the coupon could be time-sensitive, which would provide further incentive to the user to use the system in a prompt and efficient manner. When the radio media is used, a tonal or spoken cue may be included during the advertising message to accomplish the same result.

The amount of redemption discount included with a coupon downloaded to a user may be varied depending on certain demographic information that the system has about the user. For instance, the system may provide a certain value for known users of a brand (which information it will obtain by demographic inquiry or through previous redemptions in the system), and it may provider a higher discount in order to provide an incentive to users of a competitive brand. The ability to vary the value of a discount offer in accordance with such demographic and usage data is a unique advantage offered by the system of the present invention and heretofore unavailable in the prior art.

Referring to FIG. 8, an alternative means of communication between the online service provider 2 or the coupon distributor 16 and the remote computer 6 is illustrated. A satellite communications apparatus 94 is advantageously used to provide a wireless data link 4. In this embodiment, the data communications interface 20 is a satellite antenna dish or other transceiver unit which provides operative communication between the remote computer 6 and the satellite 94. A similar unit is located at the online service provider 2 in order for full wireless data communications to be achieved.

The flowchart of FIG. 9 illustrates the flow of information in the system of the present invention. The information flow illustrated therein has been described in detail in connection with the implementing system.

In a further alternative embodiment of the present invention, the functions of the online service provider 2 are carried out at a site on the Internet. That is, a user may access the coupon data repository by accessing an appropriate Internet site. In this embodiment, the downloaded coupon management routines are encoded with a unique user identification number, which may be for example the user's e-mail Internet address. When the user requests coupon data packages to be transmitted, the user identification number is encrypted and sent to the Internet site along with the request. Appropriate routines are implemented at the Internet site to decrypt the user's identification number and compare it against a list of valid members in order to ensure the validity of the user.

In another alternative embodiment of the present invention, all coupon data management functions are carried out by the online service provider 2 rather than by the off-line coupon data management routines 32. In this case, the speed of access of the online service provider 2 must be high, for example on the order of 28.8 kbps. When high speed communications are used, the need for off-line data manipulation is eliminated and all processing can be carried out in an efficient manner while connected to the online provider 2.

Figure 11:
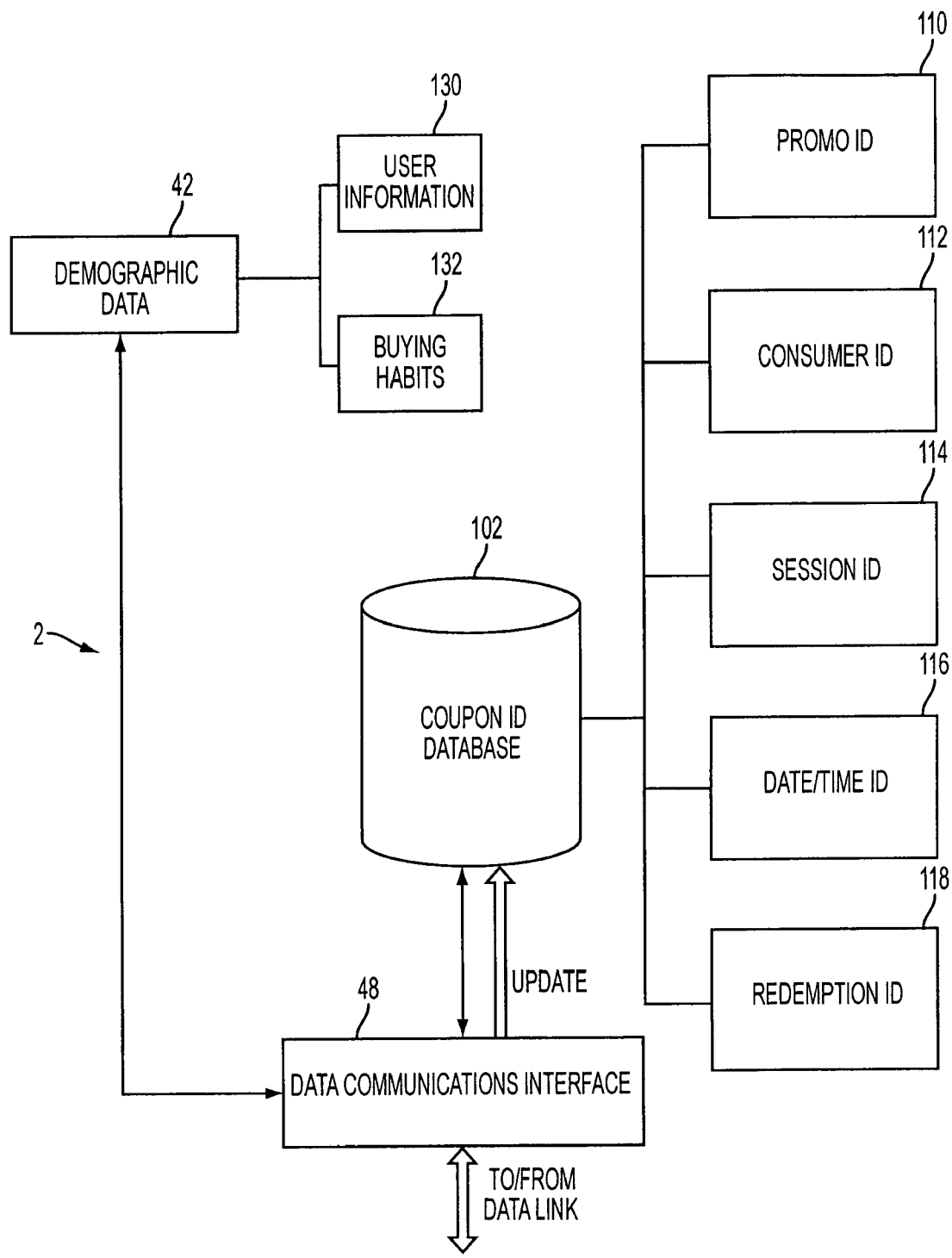
FIG. 11 is a schematic block diagram illustrating a coupon identification database of another embodiment of the present invention.

FIG. 11 illustrates a coupon identification database of the online service provider 2 according to another embodiment of the present invention. Coupon Id Database 102 may be used in conjunction with the files and data described in FIG. 6 (discussed above). Coupon Id Database 102 may include one or more of the following types of data associated with one another (e.g., through data tables or another type of system): Promotional Id 110, Consumer Id 112, Session Id 114, Date/Time Id 116, Redemption Id 118, and other information. Coupon Id Database 102 communicates with the user via the data communications interface 48. Coupon Id may also refer to incentives, rebates, sales notification and other material.

When a user selects a desired coupon (or other incentive), the user may request a print out, an electronic copy of the coupon, or other modes of receiving the selected coupon. A unique identification coupon id may be associated with each coupon. For example, if the user requests a hard copy of the coupon, a unique identification coupon id may be encoded on the coupon.

The unique coupon id may be in the form of symbols of other identifying marks, such as a bar code, a series of numbers and/or letters or any combination thereof or other method that indicates a unique coupon id. A coupon is dispensed to the user when the user selects a desired coupon and requests a print out, an electronic copy, or other form of the coupon. When a coupon is dispensed to a user, the unique Coupon Id is also recorded in Coupon ID Database 102 comprising a plurality of data tables, for example. For each coupon dispensed, online service provider 2 may store to Coupon ID Database 102 content into the various data tables Promotion Id 110, Consumer Id 112, Session Id 114, Date/Time Id 116, Redemption Id 118, and other information associated with the coupon, manufacturer, and/or user associated with the unique Coupon Id. At least one of the data tables associates each Coupon Id with one or more of a Promotion Id and a Consumer Id. Preferably, the Coupon Id is also associated in a data table with a Session Id and information regarding the date/time of printing.

Promotion Id 110 may include coupon/incentive information, such as the item description (including model and manufacturer), the amount of discount, the original retail price, issuer information, expiration date, issue date, restrictions (e.g., buy 3, get one free), method of distribution, eligibility, and other information. Consumer Id 112 may include the consumer's unique identifier which may be associated with demographic information submitted by the consumer. Session Id 114 may include information regarding the user's online experience, such as when the user was online, from what site the user selected the particular coupon, the user's connection speed, the user's ISP provider, the hardware/software used to establish the connection (e.g., PDA, phone, PC, etc.) and other information. Date/Time Id 116 may include the date, day of the week, time and other information related to the user's selecting and printing process. Redemption Id may be updated when the user redeems the selected coupon.

This information may include from what store and branch location the user redeemed the coupon, when the user redeemed the coupon, and other information related to the redemption process.

Demographic data 42 may include information related to the user's personal information, buying habits, and other information. Consumer Id 112 may be used to associate demographic data related to a particular consumer. User information 130 may include the user's residence information (e.g., address, whether the user rents or owns), type of housing (e.g., townhouse, apartment, condominium, stand alone house, etc.), income, interests (or hobbies), user status (e.g., single, married, divorced), household information (e.g., whether the user has children, how many, the age/gender of each child), ethnic background, pets, and other personal information. Buying habits 132 may include information regarding the user's purchases, such as items purchased, selected stores, selected brands, user loyalty to a particular brand or store, coupons frequently used, redemption rate, and other information This information may be gathered through the redemption process (e.g., what coupons were redeemed by the user) or other sources.

Coupon distributor 16, Coupon Issuer 14 and other authorized entities may utilize Coupon Id data to track a consumer's purchases, track a particular coupon, track the sales of a particular item or line of items. Coupon Id data may also be used to target a specific customer or group of customers. Coupon Id data further provides advanced security features. Not only may the unique coupon id prevent duplication of the downloaded coupon, but the Coupon Id data provides specific information including consumer id, session id, date/time id and other identifying information. Detailed information also provides the ability to verify actual sales and redemption.

Figure 12:
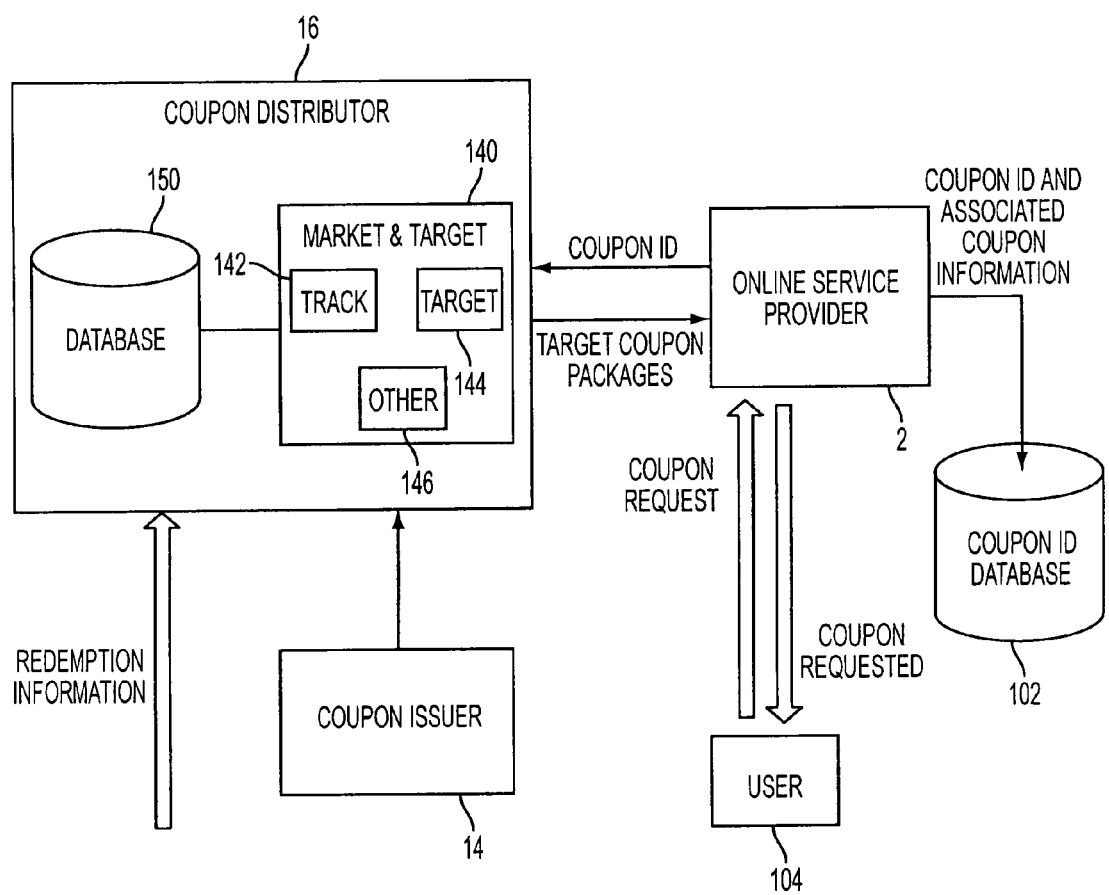
FIG. 12 is a schematic block diagram of the implementation of coupon identification data of another embodiment system of the present invention.

FIG. 12 illustrates an implementation of unique coupon identification data according to an embodiment of the present invention. A user 104 may request a coupon from Online Service Provider 2. Upon dispensing the coupon requested, unique coupon identification data is stored in Coupon Id Database 102, as detailed in FIG. 11. The Coupon Distributor 16 (or Coupon Issuer 14 through Coupon Distributor 16) may request coupon identification data from Online Service Provider 2. Relevant Coupon Id data, demographic data, and other information may be stored and sorted accordingly in database 150 associated with Coupon Distributor 16. Redemption information received from the redemption facilities may also be stored in database 150.

For example, coupon distributor 16 may desire to track the redemption of a coupon for a particular item through Track module 142. Coupon distributor 16 may also desire to track items selected by a particular customer and/or the items redeemed by a particular customer. This information may be used to determine consumer buying habits, sales data for particular items or lines of items, and other information.

In another example, coupon distributor 16 may request coupon identification data to target users through Target module 144. A coupon distributor or coupon issuer may segment coupon id data to target a particular individual or groups of individuals. A particular individual may be targeted by using a specific consumer id. A group of consumers may be targeted by dividing customers by characteristics, such as buying habits and demographics. For example, a coupon distributor may want to target consumers who own dogs and purchase a particular brand of dog food to try a new and improved line of the same dog food. In another example, it may become evident that a particular consumer is in the habit of buying items in bulk. A coupon distributor may then target that particular consumer (through the consumer id) and offer coupons that reward bulk purchases. For example, that consumer may be offered a coupon for $1.50 off of 5 rolls of paper towels or a coupon for a free shampoo when 3 shampoos of a particular brand are purchased. In addition, advertisements, promotions, and other marketing strategies may also be targeted to a particular consumer or group of consumers based on coupon id data, demographic data and other information. Other variations exist.

Figure 13:
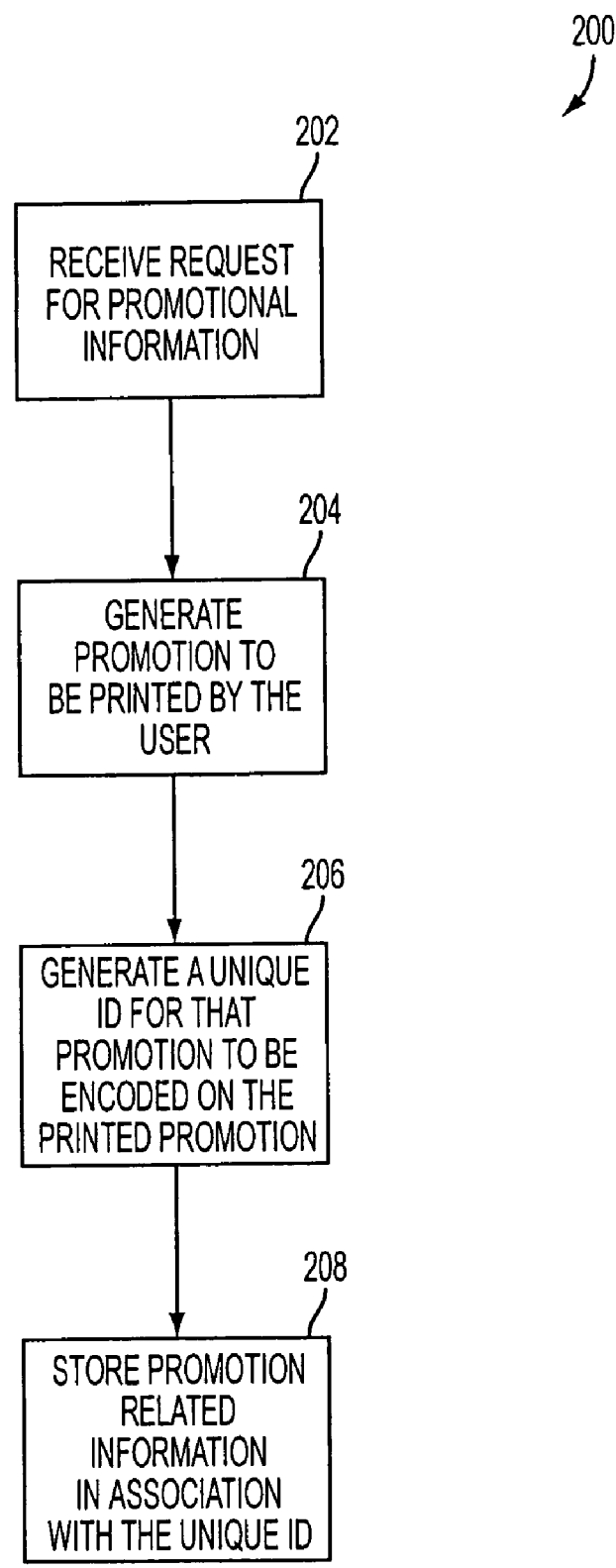
FIG. 13 is a flowchart of a method for generating promotions with a unique identifier according to another embodiment of the present invention.

FIG. 13 illustrates a flowchart of a method 200 for generating promotions with a unique identifier according to another embodiment of the present invention. In step 202, a processing system (e.g., an online service provider or other coupon service provider) may receive a request for promotional information from a user. Promotional information may include coupons, rebates, free samples, sales notification and other information. At step 204, the processing system may generate a promotion to be printed by the user. The user may download the promotion, print the promotion to obtain a hard copy, generate an electronic version of the promotion, or obtain another form of the promotion. At step 206, a unique identifier for that particular promotion may be encoded on the promotion when the promotion is printed or otherwise obtained by the user. At step 208, promotion related information associated with the unique identifier is stored in a database. This information stored in the database may be available to a coupon distributor, coupon issuer or other authorized entity for tracking, targeting and security purposes as well as other features.

Figure 14:
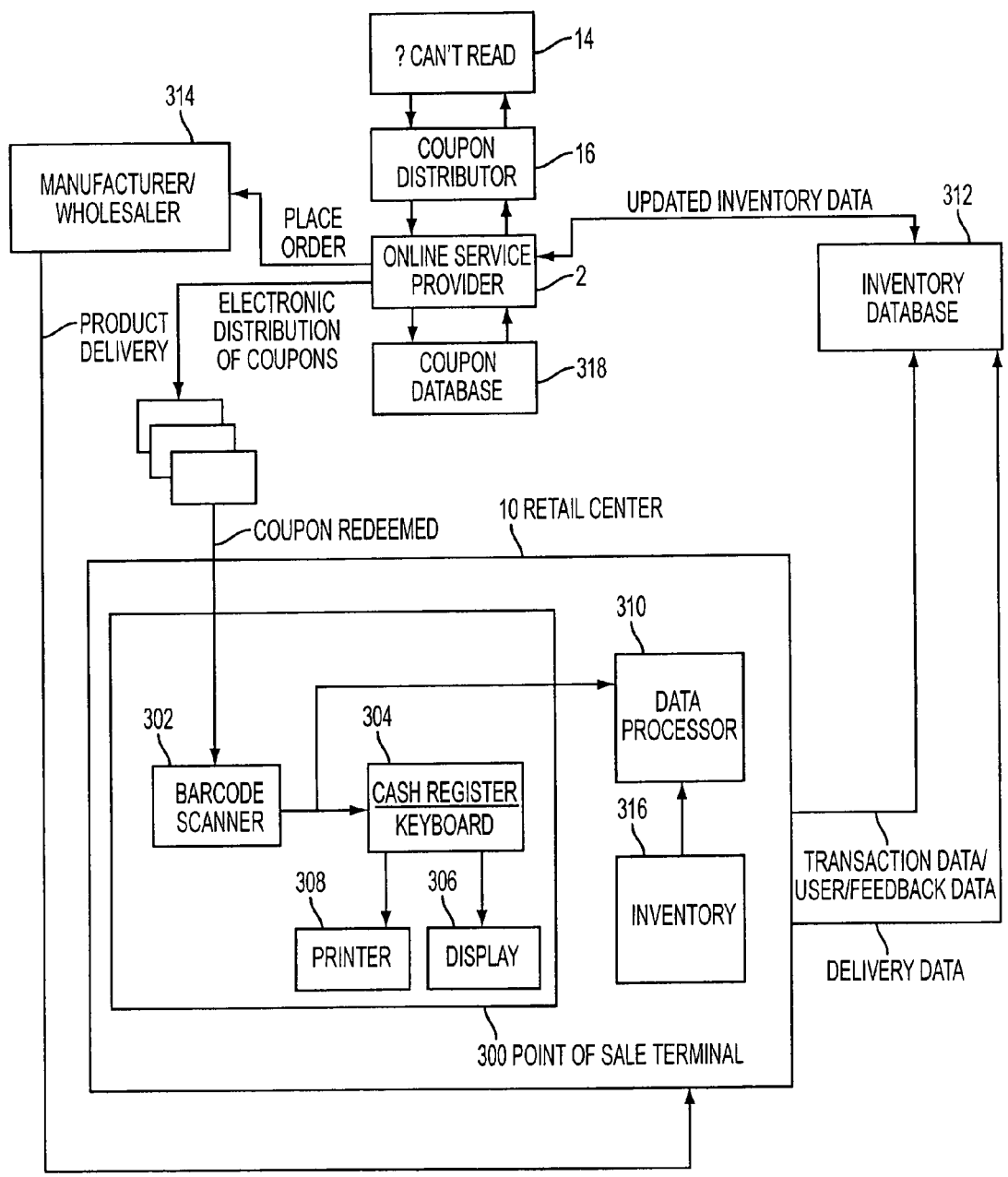
FIG. 14 is a schematic block diagram of one implementation of the invention for management of inventory and/or promotional campaigns involving electronically distributed coupons.
Figure 15:
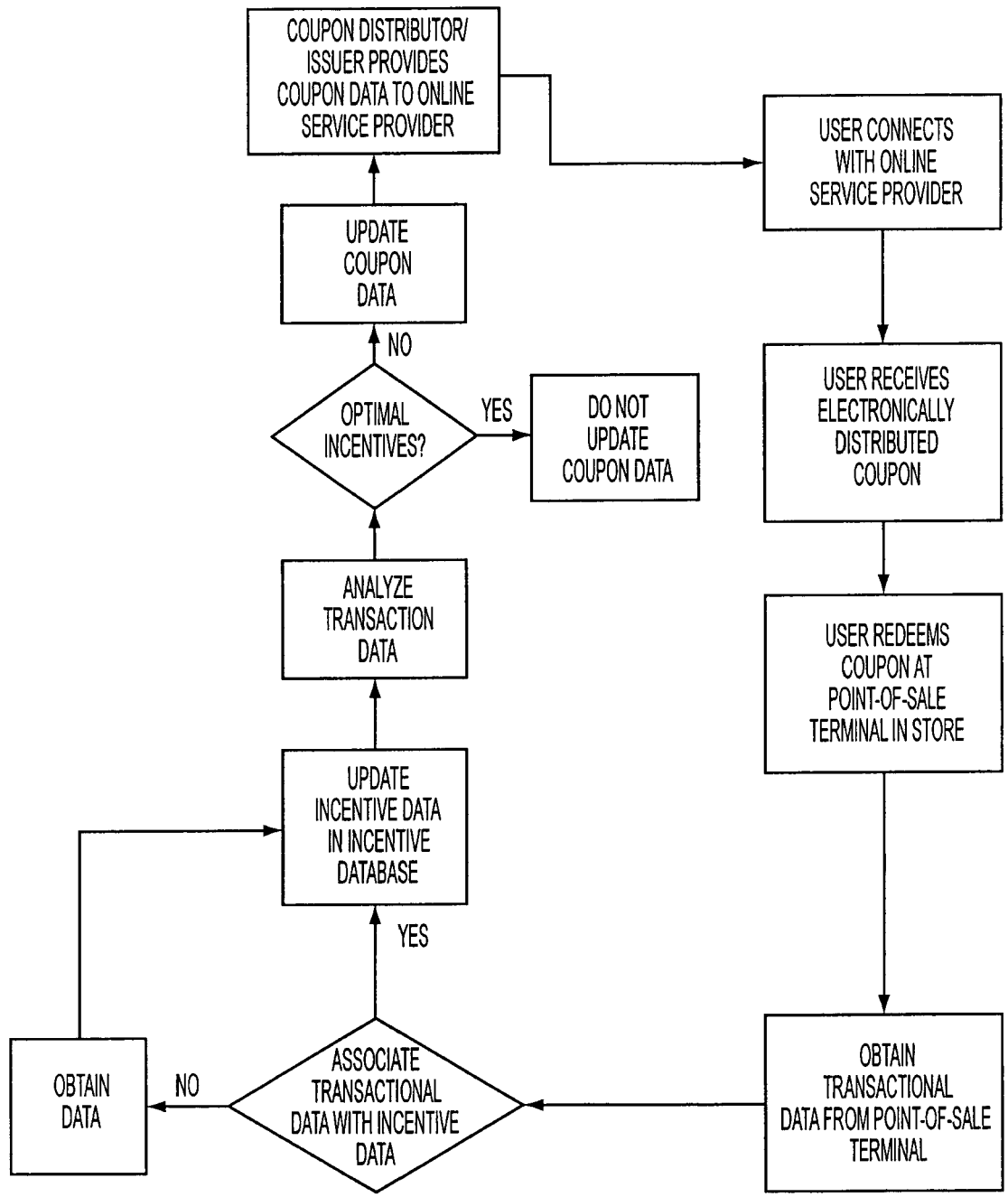
FIG. 15 is a flowchart of one implementation of the invention for management of inventory and/or promotional campaigns involving electronically distributed coupons.

Referring to the block diagram of FIG. 14 and the flow chart of FIG. 15, an inventory and promotions campaign management system is depicted. As shown in the figures, coupons are distributed to consumers by a coupon issuer 14 and/or a coupon distributor 16 through an online service provider 2. An inventory database 312 is accessible to the online service provider 2 or the coupon issuer 14 and/or the coupon distributor 16. This inventory database 312 stores inventory data, including the type and quantity of a product or products currently available for purchase at a retail center or a plurality of retail centers. Incentives, such as paper coupons or electronic coupons, are distributed via the online service provider 2 to users. A user redeems the incentive by engaging in the transaction corresponding to that incentive, for example, by making an online purchase and then consummating the transactions by a personal visit to the retail center or by making a personal visit to the retail center for the entire transaction at which time a paper coupon could be presented without limitation.

The transaction is consummated at a point-of-sale terminal 300 located in a retail center 10. The point-of-sale terminal 300 includes a bar code scanner 302, a cash register key board 304, a display 306 and a printer 308. The point-of-sale terminal 300 also includes or accesses a data processor 310. In one implementation of the invention, a user consummates the transaction by presenting a paper coupon at the point-of-sale terminal 300 which is then scanned by the bar code scanner 302 such that the incentive represented by the coupon is applied to the product. For example, a discount on the price of the product is applied automatically to reduce the price of the product when the clerk operating the point-of-sale terminal 300 processes the transaction, without limitation.

In another implementation of the invention, the user engages in an online transaction and then proceeds to make a personal visit to the retail center 10 for the purpose of receiving the product presented by the online transaction. The user consummates the transaction by presenting identification indicia (e.g., name, membership identification number, invoice number, etc.) at the point-of-sale terminal 300. The transaction is recorded in a data processor 310 as transaction data. Transaction data includes, for example, product type, user identification indicia, user demographic data, coupon identification data, transaction invoice, etc, without limitation. Optionally, other information may be solicited from the user at the point-of-sale terminal 300. For example, user demographic data or product survey data may be solicited, without limitation.

Transaction data, as well as user feed-back data is associated with the inventory data stored in the inventory database 312 by any association means, without limitation. Referring to FIGS. 16A and 16B, in one implementation of the invention, the data, including inventory data and transaction data, are organized into data fields and/or data tables in such a manner as to allow transaction data and inventory data corresponding to a particular product at a particular retail center to be associated with one another. This may be accomplished by any conventional means, for example by the presence of at least one common identifier, without limitation. Persons of ordinary skill in the art would readily understand how to accomplish such conventional means based upon the guidance provided herein.

Once the transaction data is associated with particular inventory data, the inventory data is updated to reflect the transaction which has occurred. Updating of inventory in the inventory database 312 may occur on a real-time basis or otherwise, as desired. The online service provider 2 may access the inventory database 312 for the purpose of allowing the coupon issuer or the coupon distributor to modify the incentive or coupon data, or to place an order to the manufacturer wholesaler 314 for additional product in order to maintain optimal inventory levels. The manufacturer wholesaler 314 ships product to the retail center 10 in response to orders placed by the coupon distributor or coupon issuer. The retail center 10 receives a new shipment of product and adds the product to the inventory 316. The shipment of the new product is recorded as delivery data which is transferred to the inventory database 312 or the online service provider 2. Subsequently, the delivery data is associated with inventory and the inventory database for the purpose of updating the inventory data. Once again, the updating of the inventory data may be done on a real-time basis or otherwise, as desired. The coupon issuer or coupon distributor may monitor the inventory database in order to ascertain optical levels and place orders for product as necessary. Alternatively, the coupon distributor or coupon issuer may provide a predetermined program which automatically updates the incentive or coupon data as well as automatically placing orders to achieve optimal inventory levels and to provide optimal incentives to consumers for the purchase of the product in question.

Further, the coupon data optionally contains tracking means to track redemption rates and obtain other marketing feedback data for users in specific predetermined proximity ranges and/or competitor parameters, such as a unique identifier which may be detected at a product checkout and stored in a database of a coupon distributor, coupon issuer or online service provider. Redemption rates and other marketing feedback data may be used to generate subsequent promotions or to modify coupon data for a certain category or categories of users.

What is claimed is:

1. A computer-implemented system for managing inventory associated with a promotional campaign, the system comprising:
   at least one inventory database for storing inventory data for at least one retail center;
   at least one server operatively connected to the at least one inventory database, the at least one server configured to:
     transmit coupon data via a communication link, wherein the coupon data corresponds to at least one coupon available for redemption at the at least one retail center, and wherein the at least one coupon is associated with a unique coupon identifier;
     receive transaction data corresponding to a transaction involving the at least one coupon, wherein the transaction data includes the unique coupon identifier;
     associate the received transaction data with the inventory data to update the inventory data; and
     provide access to the updated inventory data to a coupon issuer or coupon distributor.

2. The system of claim 1, wherein the transaction data is received from a point-of-sale terminal.

3. The system of claim 2, wherein the point-of-sale terminal comprises a cash register, a keyboard, a display, a printer, a data processor and a scanning device capable of reading a bar code encoded on the at least one coupon.

4. The system of claim 2, wherein the point-of-sale terminal comprises a scanning device.

5. The system of claim 4, wherein the scanning device is capable of reading a bar code encoded on the at least one coupon.

6. The system of claim 1, wherein the at least one coupon is a paper coupon.

7. The system of claim 1, wherein the inventory data in the inventory database is updated on a real-time basis.

8. The system of claim 1, wherein the at least one server is further configured to execute an inventory management program.

9. The system of claim 1, wherein the at least one server is further configured to execute a marketing analysis program.

10. The system of claim 1, wherein the at least one coupon is distributed according to a pre-determined distribution parameter.

11. The system of claim 10, wherein the pre-determined distribution parameter is altered in response to the updated inventory data.

12. The system of claim 1, wherein the at least one server is further configured to:
    modify the coupon data based on the updated inventory data.

13. The system of claim 12, wherein the at least one server is further configured to:
    receive an instruction to modify the coupon data based on the updated inventory data that was provided.

14. The system of claim 12, wherein the at least one server is further configured to:
    automatically modify the coupon data based on a predetermined instruction.

15. The system of claim 12, wherein the at least one server is further configured to:
    transmit the modified coupon data via the communication link.

16. The system of claim 1, wherein coupons available to the user are determined based upon user-specific data stored in a user profile.

17. The system of claim 16, wherein the user-specific data includes demographic data.

18. The system of claim 16, wherein the user-specific data includes location data.

19. The system of claim 1, wherein the inventory data is updated on a real-time basis.

20. The system of claim 1, wherein the received transaction data is associated with the inventory data in a data table.

21. The system of claim 1, wherein the at least one server is further configured to provide select inventory data to the user.

22. The system of claim 1, wherein the at least one server is further configured to place a product order with a manufacturer or a wholesaler in response to the updated inventory data.

23. The system of claim 1, wherein the at least one server is further configured to:
transmit the coupon data to a user device associated with a user.

24. The system of claim 1, wherein the at least one server is further configured To:
receive delivery data that indicates that the at least one retail center received a new shipment of a product; and
further update the inventory data based on the delivery data.

25. The system of claim 1, wherein the at least one server is further configured to:
provide access to the updated inventory data via an Internet site.

26. A computer-implemented system for managing a promotional campaign based on inventory data, the system comprising:
at least one database for storing inventory data for at least one retail center and for storing coupon data corresponding to the inventory data for the at least one retail center;
at least one server operatively connected to the at least one database, the at least one server configured to:
transmit coupon data via a communication link, wherein the coupon data corresponds to at least one coupon available for redemption at the at least one retail center, and wherein the at least one coupon is associated with a unique coupon identifier;
receive transaction data corresponding to a transaction involving the at least one coupon, wherein the transaction data includes the unique coupon identifier;
associate the received transaction data with the inventory data to update the inventory data; and
modify the stored coupon data based on the updated inventory data.

27. The system of claim 26, wherein the at least one server is further configured to execute a program for customizing the stored coupon data according to a predetermined inventory level.

28. The system of claim 27, wherein the stored coupon data is customized on a real-time basis.

29. The system of claim 26, wherein the at least one server is further configured to:
transmit the coupon data to a user device associated with a user.

30. The system of claim 26, wherein the at least one server is further configured to:
receive an instruction to modify the coupon data based on the updated inventory data that was provided.

31. The system of claim 26, wherein the at least one server is further configured to:
automatically modify the coupon data based on a predetermined instruction.

32. The system of claim 26, wherein the at least one server is further configured to:
transmit the modified coupon data via the communication link.

33. A computer-implemented method for managing inventory associated with a promotional campaign, the method comprising:
storing inventory data for at least one retail center in an inventory database;
storing coupon data corresponding to the inventory data for the at least one retail center;
electronically transmitting coupon data via a communication link, wherein the coupon data corresponds to at least one coupon available for redemption at the at least one retail center, and wherein the at least one coupon is associated with a unique coupon identifier;
receiving transaction data corresponding to a transaction involving the at least one coupon, wherein the transaction data includes the unique coupon identifier;
associating the received transaction data with the inventory data to update the inventory data; and
modifying the stored coupon data based on the updated inventory data.

34. A computer-implemented method of facilitating a promotional campaign based on inventory data of a retail center, the method comprising:
transmitting, by at least one server, coupon data via a communication link, wherein the coupon data is associated with at least one coupon available for redemption at the retail center;
receiving, by the at least one server, transaction data of a transaction involving the at least one coupon;
associating, by the at least one server, the received transaction data with inventory data associated with the retailer center;
updating, by the at least one server, the inventory data based on the association; and
modifying, by the at least one server, the coupon data based on the updated inventory data.

35. The computer-implemented method of claim 34, further comprising:
transmitting, by the at least one server, the modified coupon data via the communication link.

36. The computer-implemented method of claim 34, wherein the transaction data and the inventory data comprise an identification of the retail center, the method further comprising:
associating the received transaction data based at least in part on the identification of the retail center.

* * * * *